United States Patent
Takahashi et al.

(10) Patent No.: US 6,807,224 B1
(45) Date of Patent: Oct. 19, 2004

(54) CDMA RECEIVING APPARATUS AND CDMA RECEIVING METHOD

(75) Inventors: Hideyuki Takahashi, Yokosuka (JP); Kazuyuki Miya, Kawasaki (JP); Hidetoshi Suzuki, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,521

(22) PCT Filed: Feb. 4, 2000

(86) PCT No.: PCT/JP00/00626

§ 371 (c)(1),
(2), (4) Date: Oct. 2, 2000

(87) PCT Pub. No.: WO00/48329

PCT Pub. Date: Aug. 17, 2000

(30) Foreign Application Priority Data

Feb. 9, 1999 (JP) .......................................... 11-031329

(51) Int. Cl.[7] .............................. H04B 1/69; H04B 1/707
(52) U.S. Cl. ...................................... 375/150; 375/152
(58) Field of Search ................................ 375/147, 150, 375/316, 152

(56) References Cited

U.S. PATENT DOCUMENTS

| | | | | |
|---|---|---|---|---|
| 5,781,584 A | * | 7/1998 | Zhou et al. | 375/150 |
| 5,910,948 A | * | 6/1999 | Shou et al. | 370/335 |
| 6,363,105 B1 | * | 3/2002 | Sourour et al. | 375/150 |
| 6,370,130 B1 | * | 4/2002 | Zhou et al. | 370/335 |
| 6,385,232 B1 | * | 5/2002 | Terashima | 375/149 |
| 6,590,888 B1 | * | 7/2003 | Ohshima | 370/342 |
| 6,636,557 B2 | * | 10/2003 | Imaizumi et al. | 375/147 |

FOREIGN PATENT DOCUMENTS

| | | |
|---|---|---|
| EP | 0757450 | 2/1997 |
| EP | 0838910 | 4/1998 |
| JP | 10126380 | 5/1998 |
| KR | 1999006788 | 1/1999 |

OTHER PUBLICATIONS

Kenichi Higuchi et al., "Two–Stage Rapid Long Code Acquisition Scheme in DS–CDMA Asynchronous Cellular System," Technical Report of IEICE, CS96–19, RCS96–12, May 1996, pp. 27–32.
Japanese Office Action dated Mar. 12, 2002.
English translation of Japanese Office Action.
Korean Office Action dated Jun. 28, 2002.
English translation of Korean Office Action.

* cited by examiner

Primary Examiner—Temesghen Ghebretinsae
Assistant Examiner—Qutub Ghulamali
(74) Attorney, Agent, or Firm—Stevens, Davis, Miller & Mosher, LLP

(57) ABSTRACT

A switch controlling section 204 controls a switching device 205 and a switching device 211 such that mode information, which shows that a current state of an apparatus is an initial synchronous mode, which is a power-on time, or a standby mode, which is a cell moving time, is input, correlation processing is performed by a matched filter 209 in the initial synchronous mode, and correlation processing is performed by a sliding correlator 210 in the standby mode. This makes it possible for a CDMA radio communication system to establish initial synchronization at high speed and to improve a reduction in current consumption.

11 Claims, 13 Drawing Sheets

CDMA RECEIVING APPARATUS AND CDMA RECEIVING METHOD

TECHNICAL FIELD

The present invention relates to a CDMA receiving apparatus, which is used in a radio communication system, and relates to a CDMA receiving apparatus.

BACKGROUND ART

In recent years, a radio communication system such as a cellular phone and a car phone and the like has become rapidly widespread. In the radio communication system, code division multiple access (CDMA), which has received attention recently, is a system in which a transmitting side radio transmits a wide band signal, which is secondary modulated by a spreading code, and a receiving side obtains a narrow band signal by multiplying the received signal by the same spreading code as that of the transmitting side.

In the CDMA radio communication system, a base station always transmits a control signal for establishing synchronization subjected to secondary spreading by use of the known spreading code. FIG. 1 shows a frame configuration view of the control signal for establishing synchronization transmitted from the base station in CDMA system.

As shown in FIG. 1, in the control signal, a scrambling code and a spreading code are super-imposed on data, and a first search code (FSC) for establishing slot/chip synchronization and a second search code (SSC) for identifying the scrambling code and establishing frame synchronization are multiplexed in a predesignated part of symbol such as a top portion of a slot.

In this case, the scrambling code is a long cycle spreading code, which is longer than the frame cycle and which is also referred to as long code. Similarly, the spreading code is a short cycle spreading code, which is equal to one symbol time, and which is also referred to as short code.

In the radio communication system, a mobile station establishes synchronization with a base station to which the mobile station belongs when power is on (hereinafter referred to as "initial synchronous mode"), and establishes synchronization with a base station of a destination at the time of movement between cells (hereinafter referred to as "standby mode").

FIG. 2 is a view showing the conception of initial synchronization mode. In FIG. 2, base stations 1, 2 and 3 are base stations of cells A, B, C, respectively, and they always transmit a control signal for establishing synchronization subjected to secondary spreading by use of a different spreading code, respectively. Then, it is assumed that this shows the time when a mobile station 4, which is in the cell A, turns on the power.

The mobile station 4 must first establish synchronization with base station 1 to which the mobile station belongs as an initial synchronous mode.

The initial synchronous mode is under environment such that frequency offset compensation (hereinafter referred to as "AFC") does not correctly operate and that there is no information of the base station to be connected. For this reason, it is important how slot/chip synchronization and frame synchronization should be established at high speed by identifying a scrambling code of the base station to be connected from all candidates for a scrambling code. In the initial synchronous mode, since the frequency with which power is turned on is low, there is no request of control on current consumption.

FIG. 3 is a view showing the conception of standby mode. In FIG. 3, base stations 5, 6 and 7 are base stations of cells D, E, F. Then, it is assumed that this shows the time when a mobile station 8, which is in communication with the base station 5, moves to cell E from cell D. The mobile station 8 must establish synchronization with the base station 6 of a destination, which is in cell E, as a standby mode.

In the standby mode, it is important how current consumption should be controlled in view of extension of standby time and that of communication time. The standby mode is under environment such that AFC correctly operates and that there is information of scrambling codes of adjacent base stations, and that slot/chip synchronization and frame synchronization are known to some extent. For this reason, there is no request of establishing high-speed synchronization.

The conventional CDMA receiving apparatus uses a matched filter that can identify the scramble code at high speed so as to establish initial synchronization at high speed.

However, the matched filter has a high-speed synchronous characteristic but provides a defect in which current consumption is high. Then, the conventional CDMA receiving apparatus also uses the matched filter to identify the scramble code at the standby time, causing a problem in which current consumption is increased.

DISCLOSURE OF INVENTION

It is an object of the present invention is to provide a CDMA receiving apparatus and its CDMA receiving method that is capable of improving a reduction in current consumption.

The above object can be achieved by performing the switching of two kinds of correlators adaptably according to a mode of a mobile station in order that a matched filter, which has a high-speed synchronous lead characteristic, is used at an initial synchronous time and a plurality of sliding correlators, which has low current consumption, is used at a standby time.

BEST MODE FOR CARRYING OUT THE INVENTION

Embodiments of the present invention will be specifically explained with reference to the drawings attached hereto.

Embodiment 1

Embodiment 1 explains a case in which two kinds of correlators is adaptably switched according to a mode of a mobile station in order that a matched filter, which has a high-speed synchronous lead characteristic, is used in an initial synchronous mode and a plurality of sliding correlators, which has low current consumption, is used in a standby mode.

Figure 1:
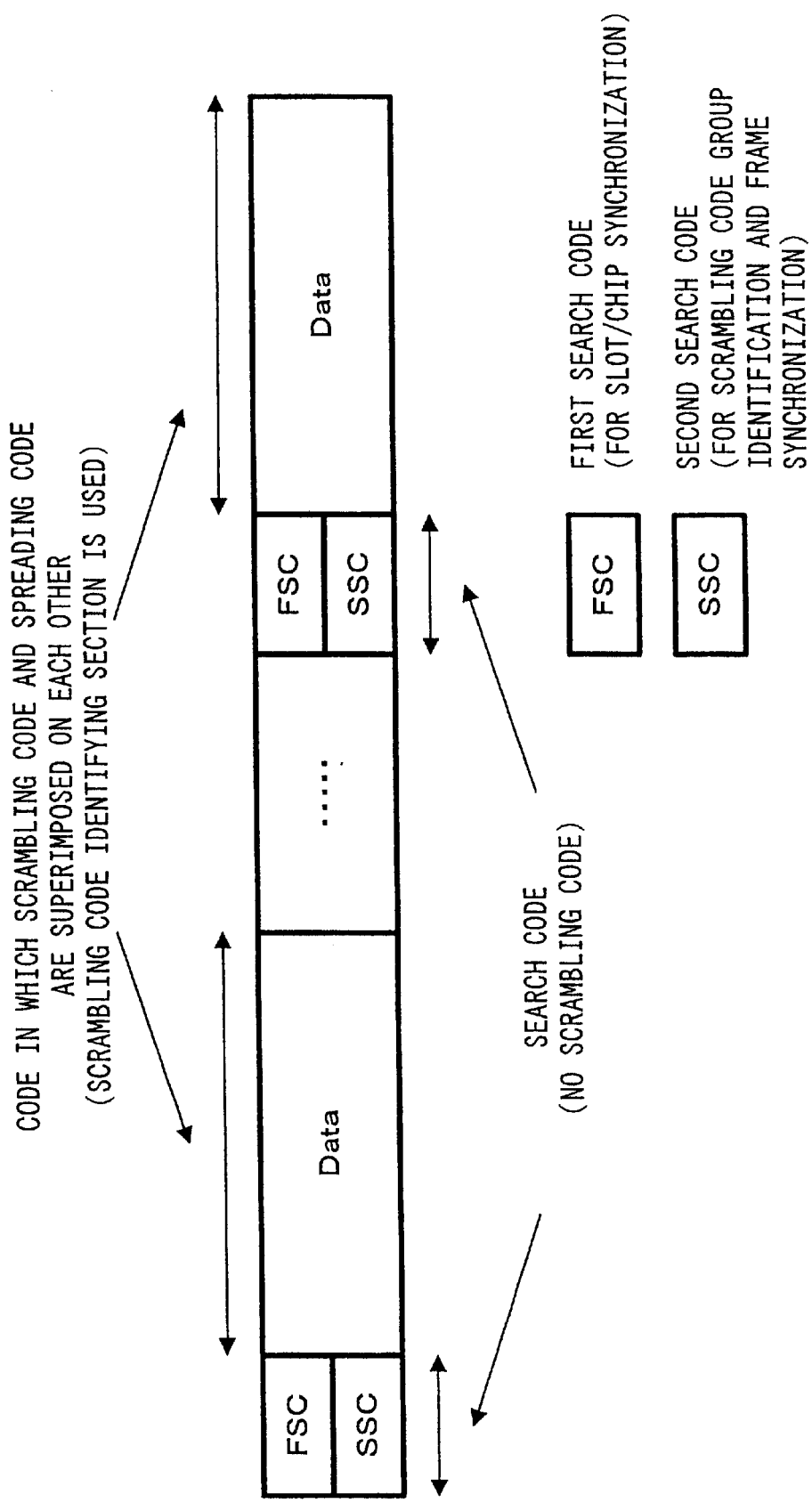
FIG. 1 is a frame configuration view of a control signal for establishing synchronization.
Figure 2:
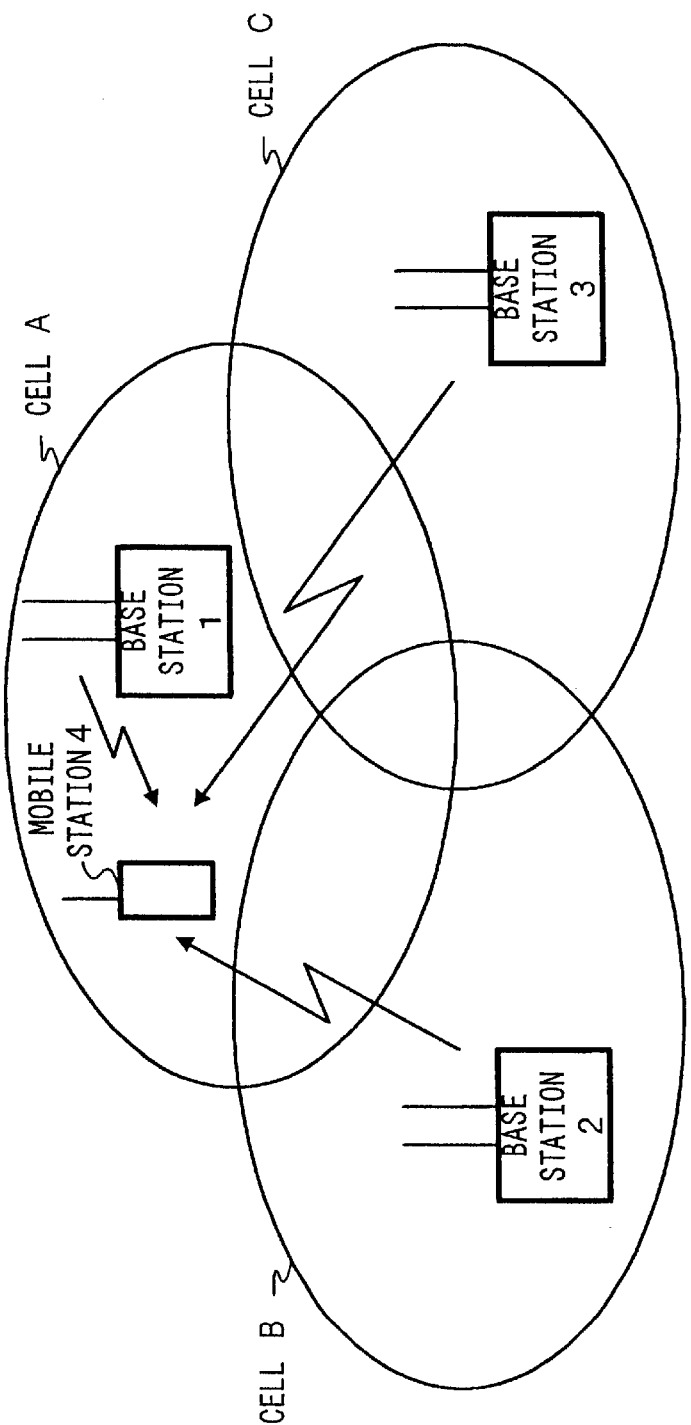
FIG. 2 is a view showing the concept of an initial synchronous mode.
Figure 3:
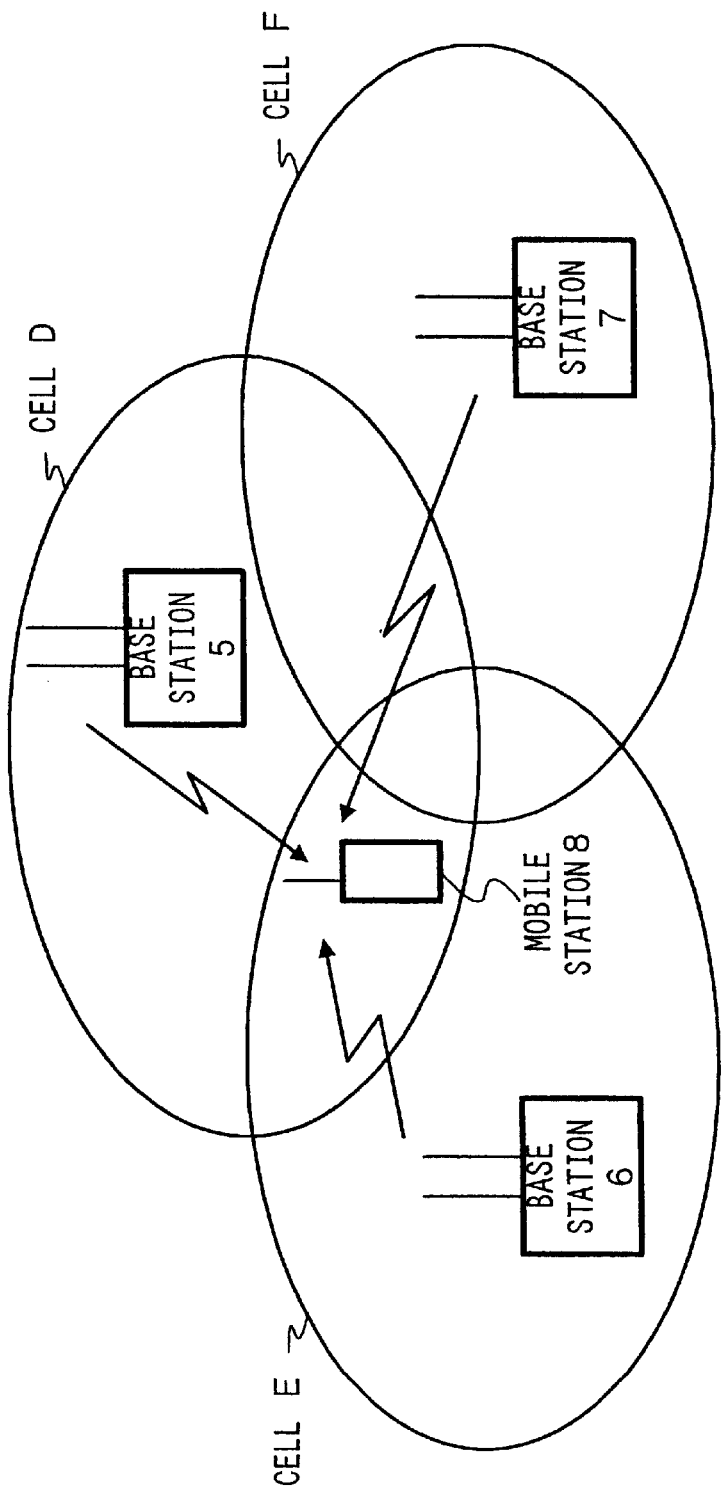
FIG. 3 is a view showing the concept of a standby mode.
Figure 4:
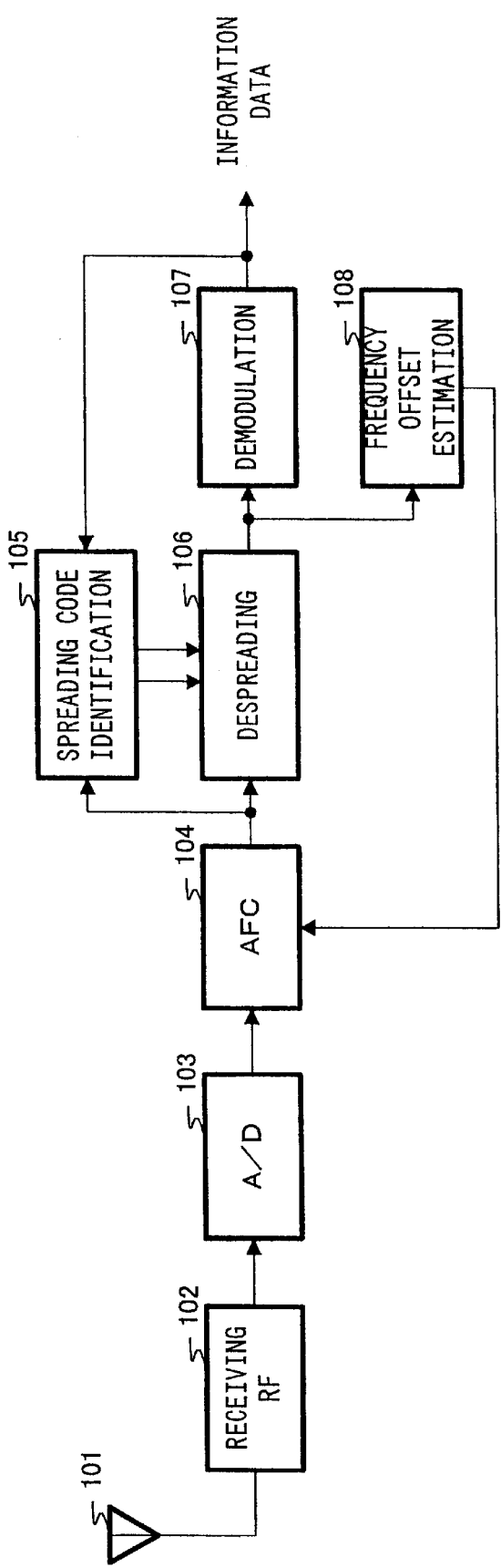
FIG. 4 is a block diagram showing the configuration of a CDMA receiving apparatus according to Embodiment 1 of the present invention.

FIG. 4 is a block diagram showing the configuration of a CDMA receiving apparatus according to Embodiment 1 of the present invention.

A receiving RF section 102 converts a radio signal received by an antenna 101 to a baseband signal, and outputs the baseband signal to an A/D converter 103. The A/D converter 103 converts the baseband signal output from the receiving RF section 102 to a digital signal from an analog signal, and outputs it to an AFC section 104. The AFC section 104 compensates for a frequency offset included in an output signal of A/D converter 103, and outputs the resultant to a spreading code identifying section 105 and a despreading section 106.

The spreading code identifying section 105 identifies a scrambling code by which an output signal of AFC section 104 is multiplied, and outputs the identified scrambling code to the despreading section 106. It is noted that the internal configuration of spreading code identifying section 105 will be described later.

The despreading section 106 despreads the output signal of AFC section 104 with slot/chip synchronous and frame synchronous timing by use of the identified scrambling code, and outputs the despread signal to a demodulating section 107 and a frequency offset estimating section 108.

The demodulating section 107 demodulates the output signal of despreading section to take up information data. The frequency offset estimating section 108 estimates a frequency offset using the output signal of despreading section 106, and outputs a signal for compensating for the frequency offset to the AFC section 104.

Next, the internal configuration of spreading code identifying section 105 will be explained using the block diagram of FIG. 5.

A slot/chip synchronizing section 201 performs a correlation computation between the output signal of AFC section 104 and a first search code FSC to establish slot/chip synchronization, and outputs a signal, which shows timing of slot/chip synchronization, to a timing control section 202. Moreover, the slot/chip synchronizing section 201 outputs the signal, which has been subjected to the correlation computation, to an SCG identifying section 203.

The timing control section 202 outputs the signal, which shows timing of slot/chip synchronization, to the SCG identifying section 203, and outputs a signal, which shows timing of frame synchronization, to a matched filter 209, a group of a plurality of sliding correlators 210, and a despreading section 106, respectively.

The SCG identifying section 203 performs a correlation computation between the output signal of slot/synchronizing section 201 and a second search code SSC to establish frame synchronization, and outputs a signal, which shows timing of the frame synchronization, to the timing control section 202. Moreover, the SCG identifying section 203 outputs the signal, which has been subjected to the correlation computation, to a switching section 205. At the same time, the SCG identifying section 203 identifies a scrambling code group (hereinafter referred to as "SCG"), and outputs information of identified SCG to a scramble generator 206.

A switch controlling section 204 outputs a control signal for performing the switching of switching devices 205 and 211 based on mode information, which shows whether a current state is a synchronous mode or a standby mode.

The switching device 205 is switched by the control signal output from the switch controlling section 204, and outputs the output signal of SCG identifying section 203 to the matched filter 209 in the initial synchronous mode and to the group of the plurality of sliding correlators 210 in the standby mode.

The scrambling code generator 206 outputs scrambling codes included in the identified SCG to a multiplier 208, sequentially. Moreover, a spreading code generator 207 outputs spreading codes to the multiplier 208, sequentially.

The multiplier 208 multiplies the scramble code output from the scrambling code generator 206 and the spreading code output from the spreading code generator 207 so as to generate a code in which two codes are superimposed on each other, and outputs the resultant to the matched filter 209 and the plurality of sliding correlators 210.

The matched filter 209 performs a correlation computation between the output signal of switching device 205 and that of the multiplier 208 with frame synchronous timing in the initial synchronous mode, and outputs the signal, which has been subjected to the correlation computation, to the switching device 211.

The sliding correlator 210 performs a correlation computation between the output signal of switching device 205 and that of the multiplier 208 with frame synchronous timing in the standby mode, and outputs the signal, which has been subjected to the correlation computation, to the switching device 211.

The switching device 211 is switched by the control signal output from the switch controlling section 204, and outputs the output signal, which is sent from either the matched filter 209 or the sliding correlator 210, to a peak detecting section 212.

The peak detecting section 212 detects the maximum value from correlation values corresponding to the respective scrambling codes, identifies the scrambling code, and outputs the identified scrambling code to the despreading section 106.

Figure 5:
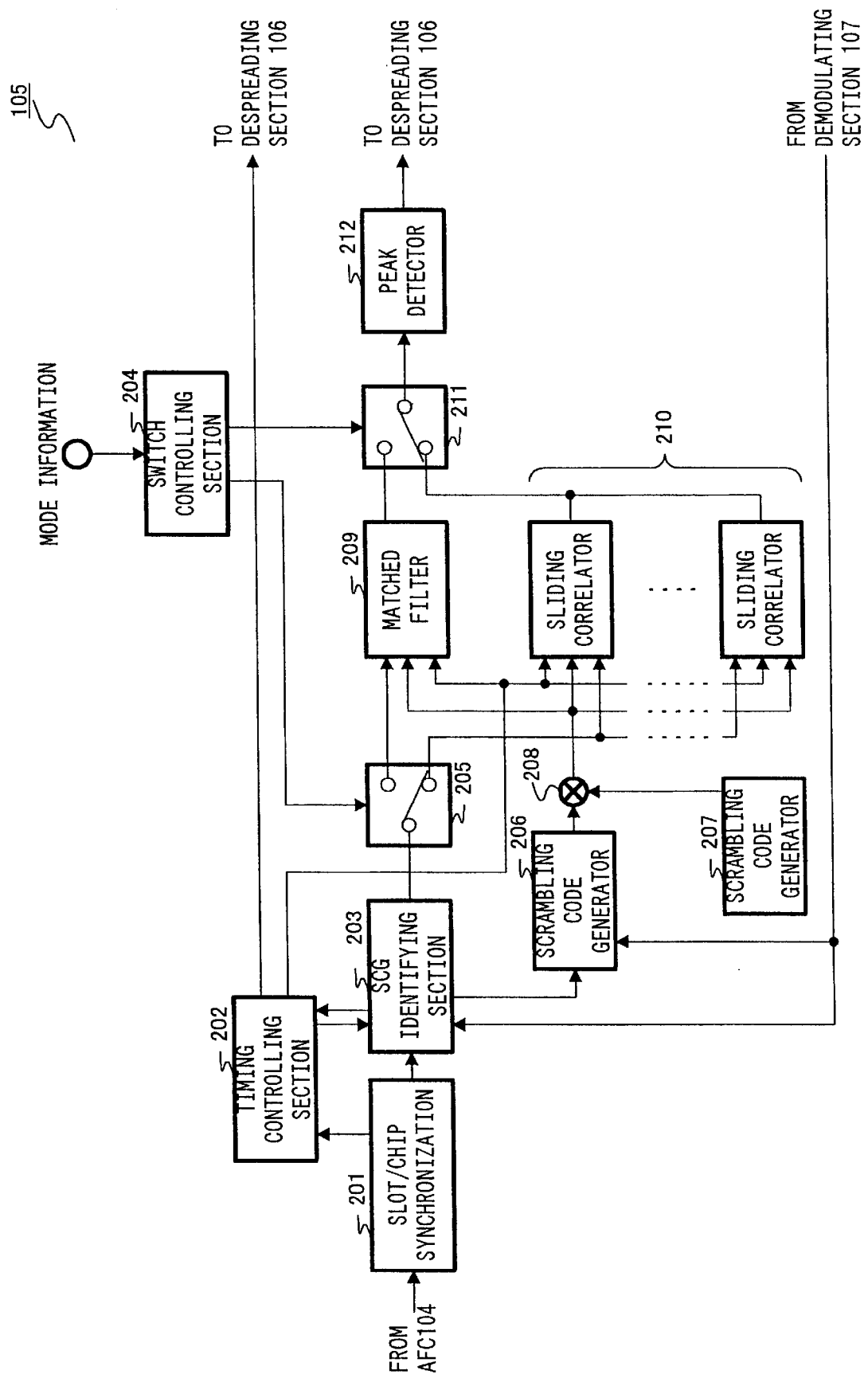
FIG. 5 is a block diagram showing the configuration of a spreading code identifying section of the CDMA receiving apparatus according to Embodiment 1 of the present invention.
Figure 6:
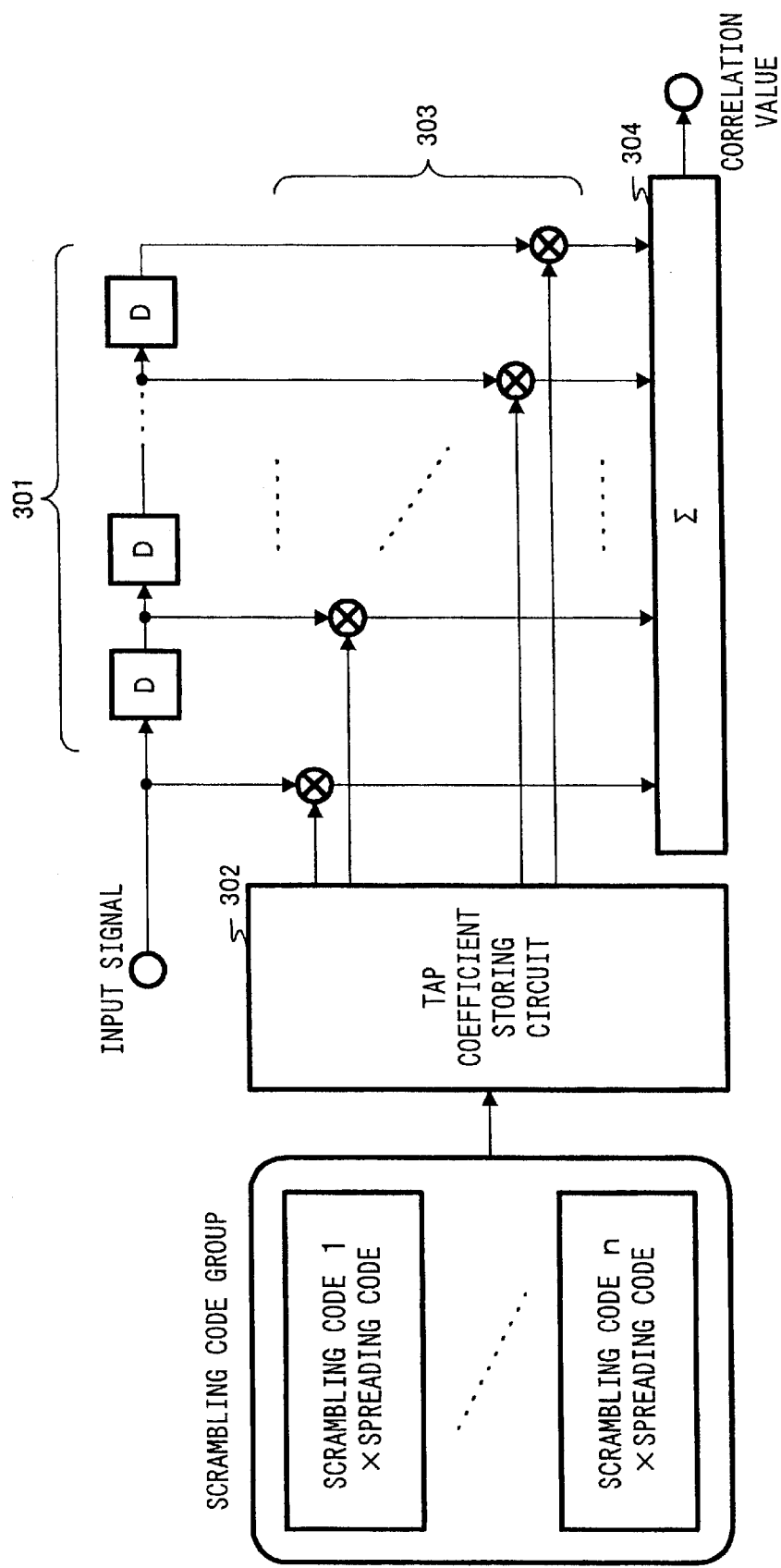
FIG. 6 is a block diagram showing an internal configuration of a matched filter.
Figure 7:
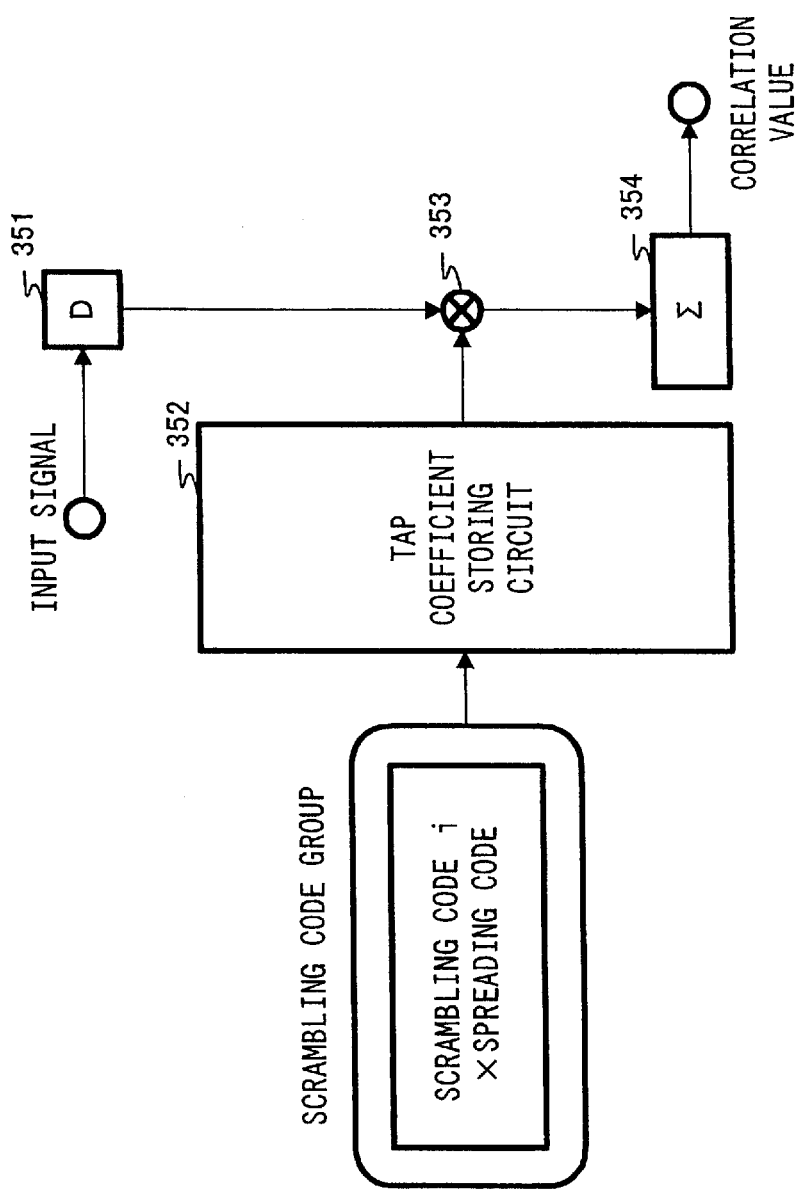
FIG. 7 is a block diagram of a sliding collator.

Next, the following will explain the internal configuration of each of the matched filter 209 and sliding correlators 210, which are shown in FIG. 5, with reference to FIGS. 6 and 7. FIG. 6 is a block diagram showing the configuration of matched filter 209, and FIG. 7 is a block diagram showing the configuration of sliding correlator 210.

The matched filter 209 shown in FIG. 6 has a plurality of delay elements 301, and a plurality of multiplexers 303 multiplexes the respective input signals, which has been sequentially delayed by delay elements 301, and a code, which has been obtained by multiplying the scrambling codes stored in a tap coefficient storing circuit 302 by the spreading code, and an adder 304 adds the output signals of multiplexers 303.

Since this makes it possible to calculate a correlation value between the candidate scrambling code and spreading code at one cycle, the matched filter 209 has a feature in which a correlation computation speed is high. However, the matched filter 209 has a defect in which current consumption is high.

While, the sliding correlator 210 shown in FIG. 7 has one delay element 351, and a multiplexer 353 multiplexes the input signal, which has been delayed by the delay element 351, and a code, which is obtained by multiplying the scrambling codes stored in a tap coefficient storing circuit 352 by the spreading code, and an adder 354 adds the output signal of multiplexer 353 for one frame period of time.

Since this makes it possible for the sliding correlator 210 to have a feature in which current consumption is low. However, the sliding correlator 210 has a defect in which a correlation computation speed is low.

In other words, the matched filter is suitable for capturing synchronization in the initial synchronous mode, and the sliding correlator is suitable for capturing synchronization in the standby mode.

Figure 8:
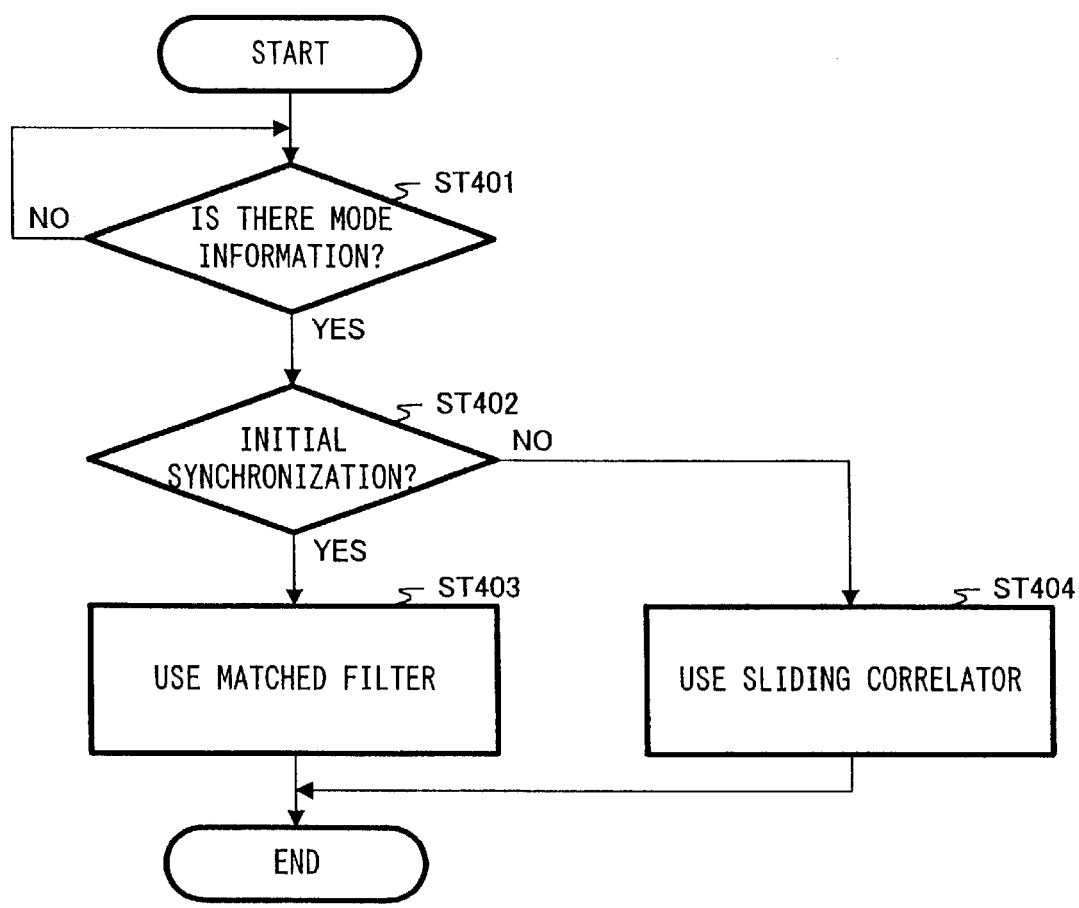
FIG. 8 is a flowchart showing the processing of a selection switch controlling section of the CDMA receiving apparatus according to Embodiment 1 of the present invention.

Next, an explanation will be given of processing, which is performed by the switch controlling section 204 shown in FIG. 5, using a flowchart of FIG. 8.

First, instep (hereinafter referred to as "ST") 401, when mode information is input to the switch controlling section 204 from an external apparatus (not shown), the switch controlling section 204 determines whether a current state is a synchronous mode or a standby mode in ST402.

Then, in ST403 and ST404, if the current state is the initial synchronous mode, the switching devices 205 and 211 are controlled so that correlation processing is performed by the matched filter 209, and if the current state is the standby mode, the switching devices 205 and 211 are controlled so that correlation processing is performed by the sliding correlator 210.

Next, the following will explain the flow of the signal received by the CDMA receiving apparatus according to this embodiment of the present invention.

The receiving RF section 102 converts a radio signal received by the antenna 101 to a baseband signal, and the A/D converter 103 converts the baseband signal to a digital signal from an analog signal, and the AFC section 104 compensates for a frequency offset and the resultant is input to the slot/chip synchronizing section 201.

The slot/chip synchronizing section 201 performs a correlation computation between the received signal, which has been subjected to AFC, and the first search code FSC to establish slot/chip synchronization, and the established slot/chip synchronous timing is input to the timing controlling section 202.

The SCG identifying section 203 performs a correlation computation between the output signal of slot/synchronizing section 201 and the second search code SSC so that the scrambling code group is identified, and frame timing is detected at the same time.

The framing timing is input to the timing control section 202, and information of the identified scrambling code group is input to the scramble generator 206.

The scrambling code generator 206 sequentially outputs scrambling codes included in the identified scrambling code group, the multiplier 208 multiplies the output scramble code and the spreading code output from the spreading code generator 207 so as to generate a code in which two codes are superimposed on each other, and outputs the resultant to the matched filter 209 and the sliding correlator 210.

Moreover, the received signal, which has been subjected to frame synchronization and output from the SCG identifying section 203, is input to the matched filter 209 through the switching device 205 by control of the switch controlling section 204 in the initial synchronous mode, and the received signal is input to the sliding correlator 210 in the standby mode.

Then, in the initial synchronous mode, the matched filter 209 calculates a correlation value by a correlation computation between a data portion of the received signal and the code generated by the multiplier 208 in a state that the slot/chip synchronization and frame synchronization are established. Further, in the standby mode, the sliding correlator 210 calculates a correlation value by a correlation computation between a data portion of the received signal and the code generated by the multiplier 208 in a state that the slot/chip synchronization and frame synchronization are established.

The correlation value, which has been output from the matched filter 209 or sliding correlator 210, is input to the peak detector 212 through the switching device 211 by control the switch controlling section 204.

The peak detector 212 detects the correlation value, and a scrambling code, which has a maximum correlation value, is identified as a scrambling code for a base station to be connected.

The despreading section 106 despreads the received signal, which has been subjected to AFC, with timing, which has been subjected to the slot/chip synchronization and frame synchronization from the timing control section 202, by use of the identified scrambling code. This despread signal is demodulated by the demodulating section 107 so as to take up information data. Moreover, the frequency offset estimating section 108 estimates a frequency offset using the output signal of despreading section 106, and outputs a signal for compensating for the frequency offset to the AFC section 104.

Thus, the correlation computation is performed by the matched filter having a high-speed synchronous lead characteristic in the initial synchronous mode, and the correlation computation is performed by the sliding correlator with low current consumption in the standby mode. This makes it possible to implement the establishment of high-speed initial synchronization of the mobile station and the extension of standby time and that of continuous communication time.

It is noted that AFC after the A/D converter and the frequency offset estimating method in the above mentioned embodiment is one example, and that the present invention can be applied to the other AFC.

Embodiment 2

Here, if the current state is the standby mode, it is possible to demodulate scrambling code information of the adjacent base station of the data portion in a broadcast channel, and if it is the initial synchronous mode, it is impossible to demodulate scrambling code information.

Embodiment 2 focuses attention on the above point, and explains a case in which the CDMA receiving apparatus determines the mode based on whether or not scrambling code information of the adjacent base station included in the demodulated signal is stored in a buffer.

Figure 9:
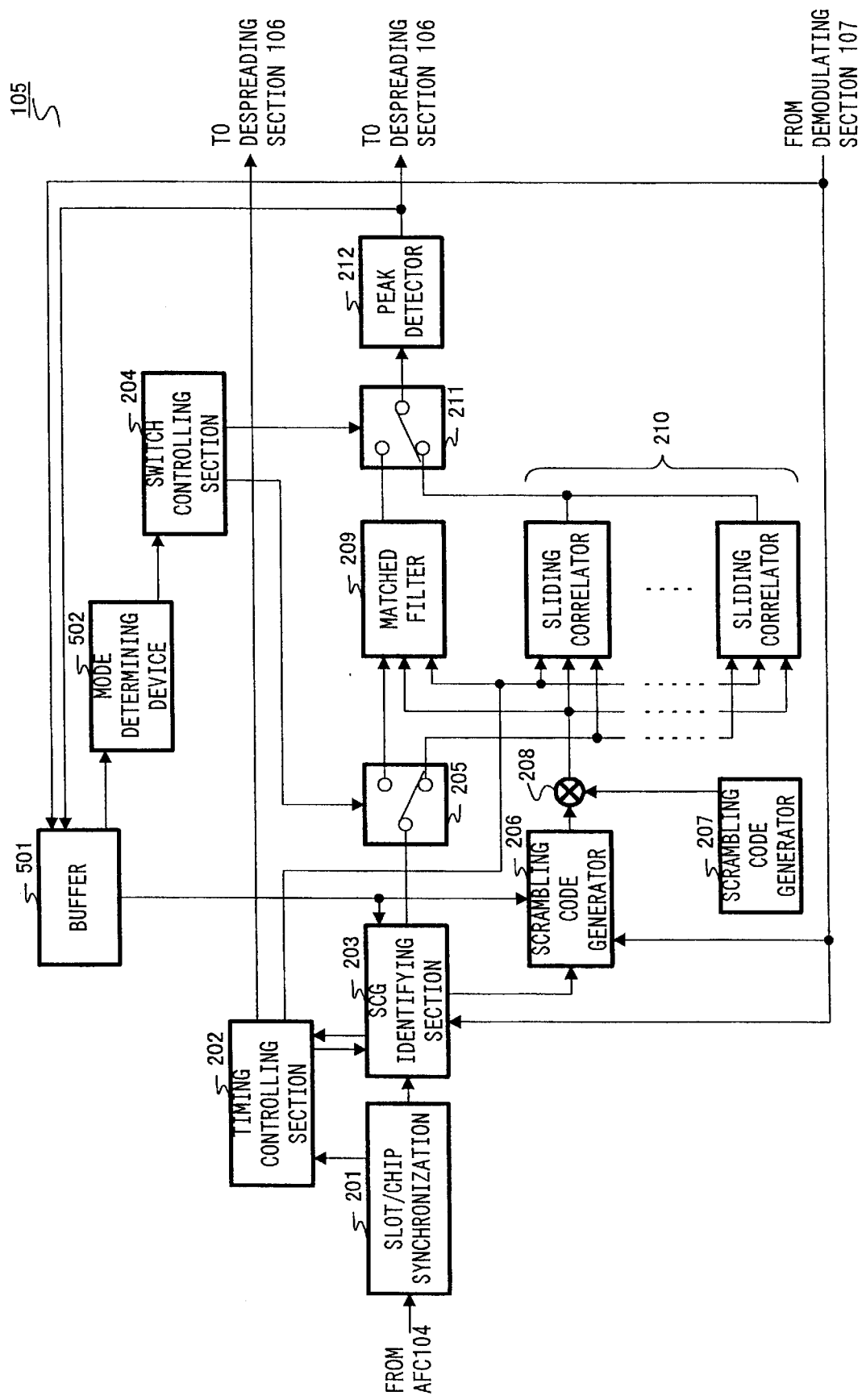
FIG. 9 is a block diagram showing the configuration of a spreading code identifying section of the CDMA receiving apparatus according to Embodiment 2 of the present invention.

FIG. 9 is a block diagram showing the internal configuration of the spreading code identifying section of the CDMA receiving apparatus according to Embodiment 2. The configuration of CDMA receiving apparatus according to this embodiment is the same as that of Embodiment 1 shown in FIG. 4, and the explanation will be omitted.

The spreading code identifying section 105 of FIG. 9 is one in which a buffer 501 in which scrambling code information of the adjacent base station is stored and a mode determining section 502 for determining the mode of the mobile station based on whether or not scrambling code information is stored in the buffer 501 are added to the spreading code identifying section 105 of FIG. 5. In FIG. 9, the same reference numerals as those of FIG. 5 are added to the portions common to FIG. 5, and the explanation thereof is omitted.

The demodulating section 107 outputs information data, which has been demodulated and taken up, to the SCG identifying section 203, scrambling code generator 206, and buffer 501, respectively.

The SCG identifying section 203 inputs scrambling code information of the adjacent base station from the buffer 501 in the standby mode, and performs correlation processing using the corresponding scrambling code.

The scrambling code generator 206 inputs scrambling code information of the adjacent base station from the buffer 501 in the standby mode, and outputs the corresponding scrambling code.

The mode determining section 502 determines whether or not the current state is the initial synchronous mode or the standby mode based on whether or not scrambling code information is stored in the buffer 501, and outputs mode information based on the determination result.

The switch controlling section 204 outputs a control signal for performing the switching of switching devices 205 and 211 based on the mode information output from the mode determining section 502.

Figure 10:
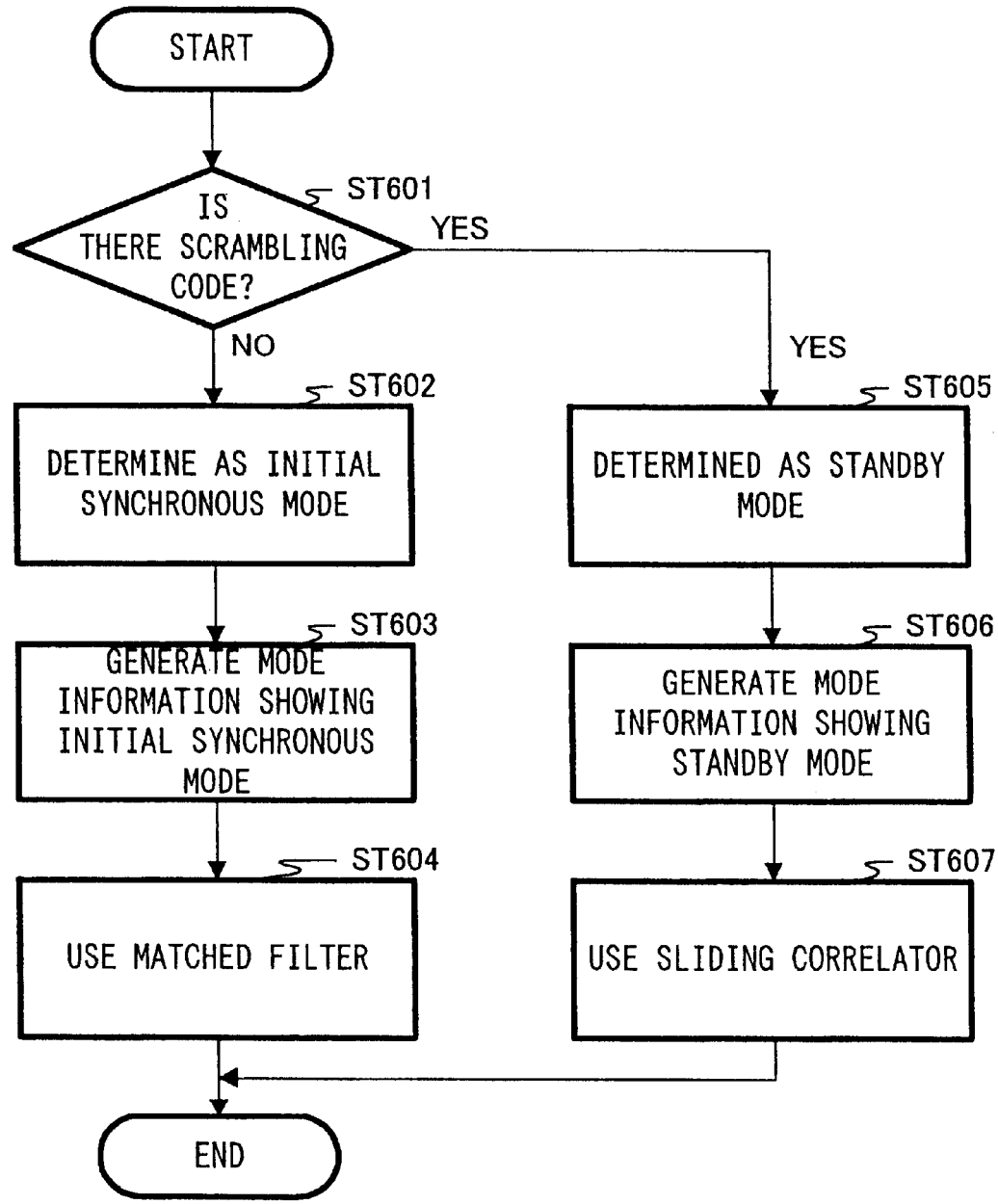
FIG. 10 is a flowchart showing the processing of a selection switch controlling section of the CDMA receiving apparatus according to Embodiment 2 of the present invention.

Next, an explanation will be given of processing, which is performed by the mode determining section 502 of FIG. 9 and switch controlling section 204, using a flowchart of FIG. 10.

It is preconditioned that scrambling code information of the adjacent base station included in the decoded signal is stored in the buffer 501 when the demodulating section 107 performs demodulation processing. It is noted that nothing is stored in the buffer 501 if the current state is the initial synchronous mode since the demodulating section 107 performs no demodulation processing.

First, in ST601, the mode determining section 502 confirms whether or not scrambling code information is stored in the buffer 501.

Then, if there is no scrambling code information in ST601, the mode determining section 502 determines that the current state is the initial synchronous mode so as to generate mode information showing the initial synchronous mode in ST602 and ST603, and outputs the resultant to the switch controlling section 204.

Then, the switch controlling section 204 controls the switching devices 205 and 211 so that correlation processing is performed by the sliding correlator 210 based on mode information in which the current state is the standby mode in ST607.

Next, the following will explain the flow of signal received by the CDMA receiving apparatus according to this embodiment of the present invention. The explanation of the portions common to Embodiment 1 will be omitted.

Scrambling code information of the adjacent base station included in the output signal of demodulating section 107 is stored in the buffer 501. Scrambling code information of the adjacent base station stored in the buffer 501 is output to the SCG identifying section 203, the scrambling code generator 206 and the mode determining section 502 in the standby mode.

If scrambling code information of the adjacent base station is stored in the buffer 501, the mode determining section 502 determines that the current state is the standby mode, and if no scrambling code information is stored therein, the mode determining section 502 determines that the current state is the initial synchronous mode.

Then, mode information, which shows the determination result, is input to the switch controlling section 204. The mode information is input to the matched filter 209 through the switching device 205 by control of the switch controlling section 204 based on mode information in the initial synchronous mode, and the mode information is input to the sliding correlator 210 in the standby mode.

Thus, the use of mode determining section 502 makes it possible to switch the initial synchronous mode and standby mode in accordance with the state of mobile station even if the input of new mode information is not provided. Therefore, in a state that both low current consumption and high-speed synchronous lead characteristic are excellent, improvement in performance of initial synchronous establishment, extension of standby time and that of communication time can be obtained.

Embodiment 3

Here, if the current state is the standby mode, it is possible to estimate that AFC operates with high accuracy. Embodiment 3 focuses attention on the above point, and explains a case in which the mode is determined based on whether or not scrambling code information is stored in the buffer and whether or not AFC operates normally.

Figure 11:
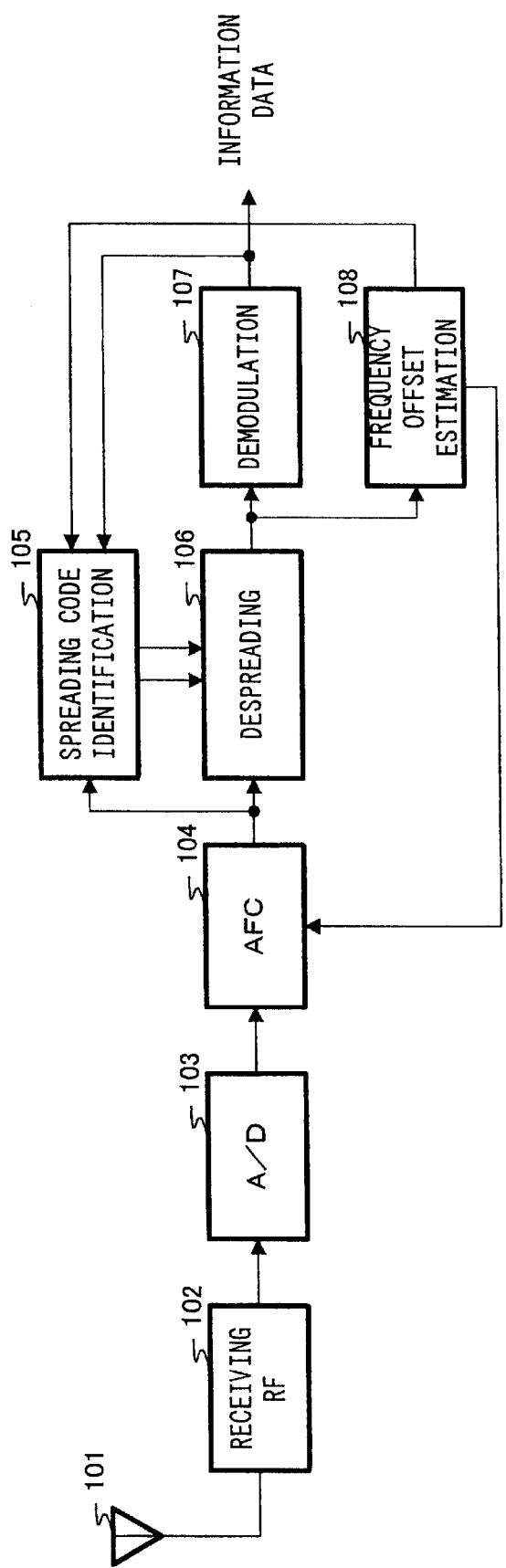
FIG. 11 is a block diagram showing the configuration of a CDMA receiving apparatus according to Embodiment 3 of the present invention.

FIG. 11 is a block diagram showing the configuration of the CDMA receiving apparatus according to Embodiment 3. The configuration of the CDMA receiving apparatus of FIG. 11 is different from that of FIG. 4 in the point that the frequency offset estimating section 108 outputs a signal for compensating for a frequency offset to the spreading code identifying section 105 in addition to AFC section 104.

Figure 12:
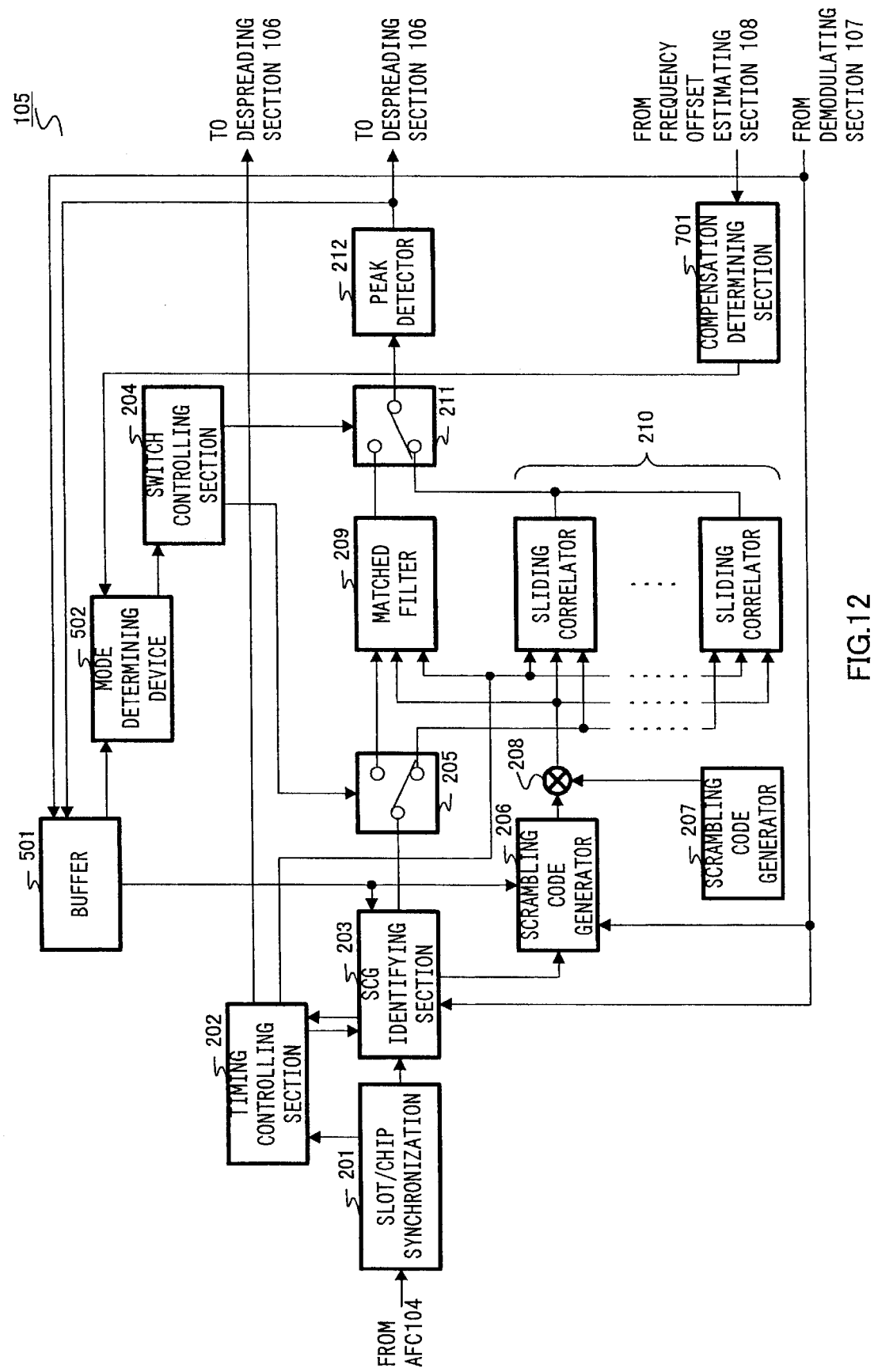
FIG. 12 is a block diagram showing the configuration of a spreading code identifying section of the CDMA receiving apparatus according to Embodiment 3 of the present invention.

FIG. 12 is a block diagram showing the configuration of the spreading code identifying section of the CDMA receiving apparatus according to Embodiment 3. The spreading code identifying section 105 of FIG. 12 is one in which a compensation determining section 701 for determining whether or not AFC operates normally is added to the spreading code identifying section 105 of FIG. 9. In the spreading code identifying section of FIG. 12, the same reference numerals as those of FIG. 9 are added to the configuration portions common to FIG. 9, and the explanation is omitted.

In a case where an absolute value of a frequency offset is smaller than a predetermined threshold value, the compensation determining section 701 determines that AFC is in a steady state and outputs a signal, which shows the determination result, to the mode determining section 502.

In a case where an absolute value of a residual frequency offset is smaller than a predetermined threshold value, reliability relating to the identification of scrambling code is low. In this case, if control for performing an operation from the slot/chip synchronization again is made, accuracy in the identification of scrambling code is more improved.

Based on whether or not scrambling code information is stored in the buffer 501 and whether or not AFC is in a steady state, the mode determining section 502 determines whether the current state is the initial synchronous mode or standby mode, and outputs mode information based on the determination result.

Figure 13:
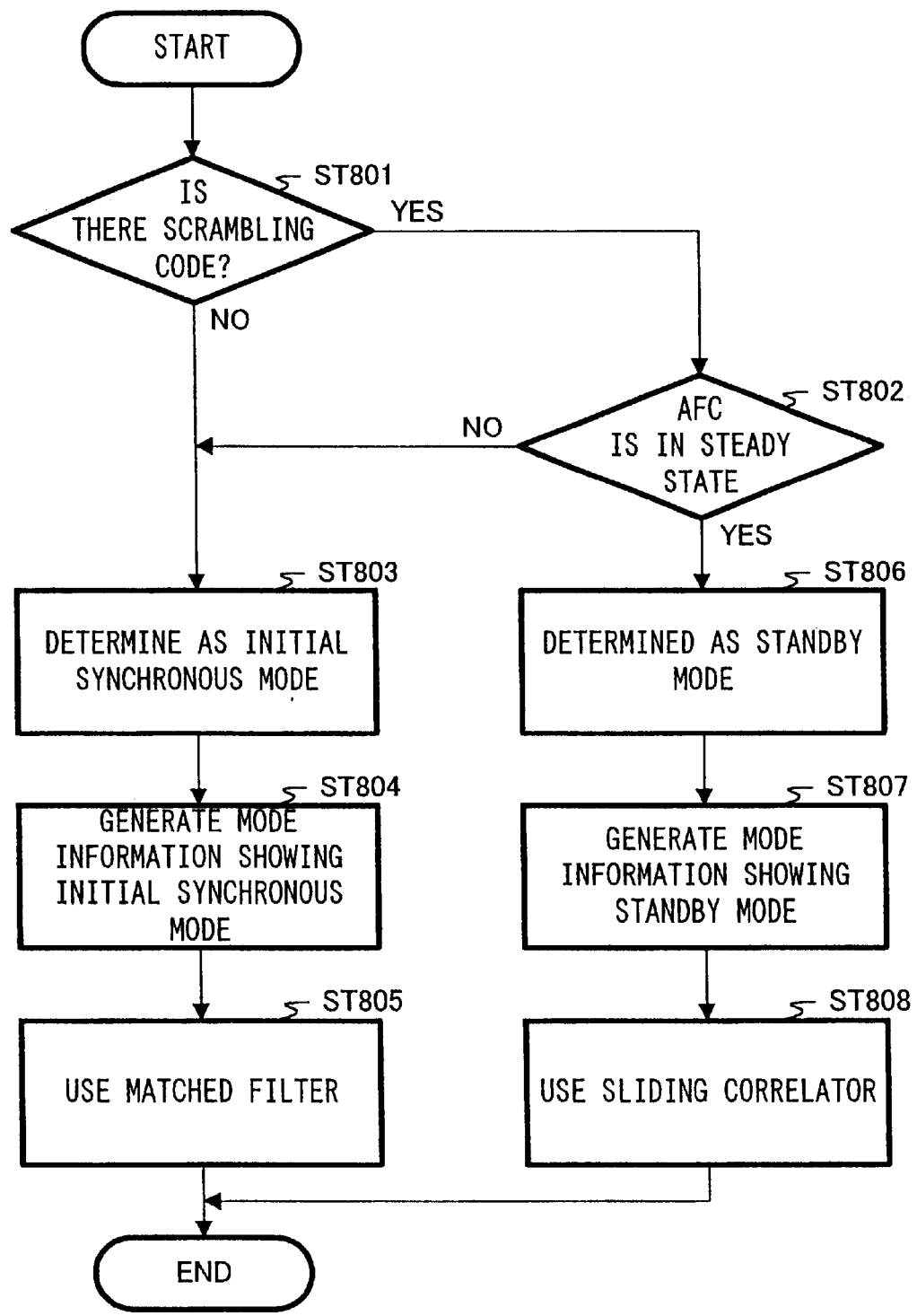
FIG. 13 is a flowchart showing the processing of a selection switch controlling section of the CDMA receiving apparatus according to Embodiment 3 of the present invention.

Next, an explanation will be given of processing, which is performed by the mode determining section 502 of FIG. 12 and the switch controlling section 204, using a flowchart of FIG. 13.

It is preconditioned that a signal in which AFC operates normally is output to the mode determining section 502 from the compensation determining section 701 if AFC is in the steady state.

First, in ST801, the mode determining section 502 confirms whether or not scrambling code information is stored in the buffer 501.

Then, if scrambling code information is stored in the buffer 501 in ST801, the mode determining section 502 confirms whether or not a signal in which AFC is in a steady state operates is input from the compensation determining section 701 in ST802.

Then, if no scrambling code information is stored in the buffer 501 in ST801 or AFC is not in the steady state in ST802, the mode determining section 502 determines that the current state is the initial synchronous mode so as to generate mode information, which shows the initial synchronous mode, and outputs it to the switch controlling section 204 in ST803 and ST804.

Then, the switch controlling section 204 controls the switching devices 205 and 211 such that correlation processing is performed by the matched filter 209 based on mode information in which the current state is the initial synchronous mode in ST805.

Moreover, if AFC is in the steady state in ST802, the mode determining section 502 determines that the current state is the standby mode so as to generate mode information, which shows the standby mode, and outputs it to the switch controlling section 204 in ST806 and ST807.

Then, the switch controlling section 204 controls the switching devices 205 and 211 such that correlation processing is performed by the sliding correlator 210 based on mode information in which the current state is the standby mode in ST808.

Next, the following will explain the flow of the signal received by the CDMA receiving apparatus according to this embodiment of the present invention. It is noted that the explanation of the portions common to Embodiment 2 will be omitted.

The residual frequency offset detected by the frequency offset estimating section 108 is compared with a threshold value by the compensation determining section 701. Then, if an absolute value of the residual frequency offset is smaller than the threshold value, it is determined that AFC is in the steady state, and the resultant is output to the mode determining section 502.

In the case where scramble code information of the adjacent base station is stored in the buffer 501 and AFC is in the steady state, the mode determining section 502 determines that the current state is the standby mode, and the mode determining section 502 determines that the current state is the initial synchronous mode in the other case.

Then, mode information, which shows the determination result, is input to the switch controlling section 204, and the mode information is input to the matched filter 209 through the switching device 205 by control of the switch controlling section 204 in the initial synchronous mode, and the mode information is input to the sliding correlator 210 in the standby mode.

Thus, the point whether or not scramble code information is stored in the buffer, and the point whether or not AFC operates normally from the compensation value of the frequency offset are set as determination conditions, whereby making it possible to perform mode determination with high accuracy and reliability.

As is obvious from the above explanation, according to the CDMA receiving apparatus of the present invention and the CDMA receiving method, the correlator to be used is selected according to each mode such that the matched filter having a high-speed synchronous lead characteristic is used in the initial synchronous mode and the sliding correlator with low current consumption is used in the standby mode, with the result that initial synchronization can be established at high speed and the reduction in current consumption can be improved.

This application is based on the Japanese Patent Application No. HEI 11-031329 filed on Feb. 9, 1999, entire content of which is expressly incorporated by reference herein.

What is claimed is:

1. A CDMA receiving method comprising:
   (a) switching a path of a received signal when an apparatus implementing said method is powered on and when said apparatus moves across cells, and performing correlation processing of a scrambling code provided in the received signal using:
   a matched filter when said apparatus is powered on; and
   a sliding correlator when said apparatus moves across the cells, wherein said correlation processing provides a maximum correlation value when said apparatus is powered on based upon the received signal input to the matched filter and when said apparatus moves across cells based upon the received signal input to the sliding correlator, and
   (b) detecting one of a plurality of scrambling codes corresponding to said maximum correlation value; and
   (c) identifying the one scrambling code detected in step (b) as a scrambling code of a base station apparatus with which to establish communication.

2. The CDMA receiving method according to claim 1, further comprising storing a previously received scrambling code of a nearby cell in a buffer, wherein the correlation processing is performed using the sliding correlator when the buffer has the previously received scrambling code stored therein.

3. The CDMA receiving method according to claim 1, further comprising:
   storing a previously received scrambling code of a nearby cell in a buffer; and
   confirming whether or not an amount of frequency offset is within a predetermined range, wherein:
   the correlation processing is performed using the sliding correlator, when the buffer has the previously received scrambling code stored therein and the amount of frequency offset is within the predetermined range.

4. A CDMA receiving apparatus comprising:
   a matched filter and a sliding correlator that each perform correlation processing of a scrambling code provided in a received signal;

a switching control section that performs switching control such that during an initial synchronization mode the received signal is input to the matched filter, and during a wait mode the received signal is input to the sliding correlator; and a peak detecting section that detects one of a plurality of scrambling codes corresponding to a maximum correlation value output alternatively from (i) the matched filter during the initial synchronization mode and (ii) the sliding correlator during the wait mode.

5. The CDMA receiving apparatus according to claim 4, wherein the switching control section performs the switching control with reference to mode information that indicates whether said apparatus is in the initial synchronization mode or in the wait mode.

6. The CDMA receiving apparatus according to claim 5, further comprising:

a storing section that stores decoded information on a temporary basis; and a mode determining section that determines what state said apparatus is in with reference to the decoded information in said storing section and outputs the determined state as the mode information, wherein:

the switching control section performs the switching control with reference to the mode information output from the mode determining section.

7. The CDMA receiving apparatus according to claim 6, wherein the mode determining section determines that said apparatus is in the wait mode, when there is scrambling code information stored in said storing section.

8. The CDMA receiving apparatus according to claim 6, further comprising:

a steady state confirming section that outputs a confirmation signal to the mode determining section when an amount of frequency offset is within a predetermined range, wherein:

the mode determining section determines the state said apparatus is in with reference to the decoded information in the storing section and based on whether or not said confirmation signal has been output from said steady state confirming section.

9. The CDMA receiving apparatus according to claim 8, wherein the mode determining section determines that said apparatus is in the wait mode, when there is scrambling code information stored in the storing section and the confirmation signal has been output from said steady state confirming section.

10. A communication terminal apparatus having a CDMA receiving apparatus, said CDMA receiving apparatus comprising:

a correlation processing section comprising a matched filter and a sliding correlator that each perform correlation processing of a scrambling code provided in a received signal;

a switching control section that performs switching control such that during an initial synchronization mode the received signal is input to the matched filter, and during a wait mode the received signal is input to the sliding correlator; and a peak detecting section that detects one of a plurality of scrambling codes corresponding to a maximum correlation value output alternatively from (i) the matched filter during the initial synchronization mode and (ii) the sliding correlator during the wait mode.

11. The communication terminal apparatus according to claim 10, wherein the switching control section performs the switching control with reference to mode information that indicates whether said CDMA receiving apparatus is in the initial synchronization mode or in the wait mode.

\* \* \* \* \*